Dec. 31, 1935.  E. L. WALTERS  2,026,109
CUTTING MACHINE
Original Filed Jan. 22, 1934    5 Sheets-Sheet 1
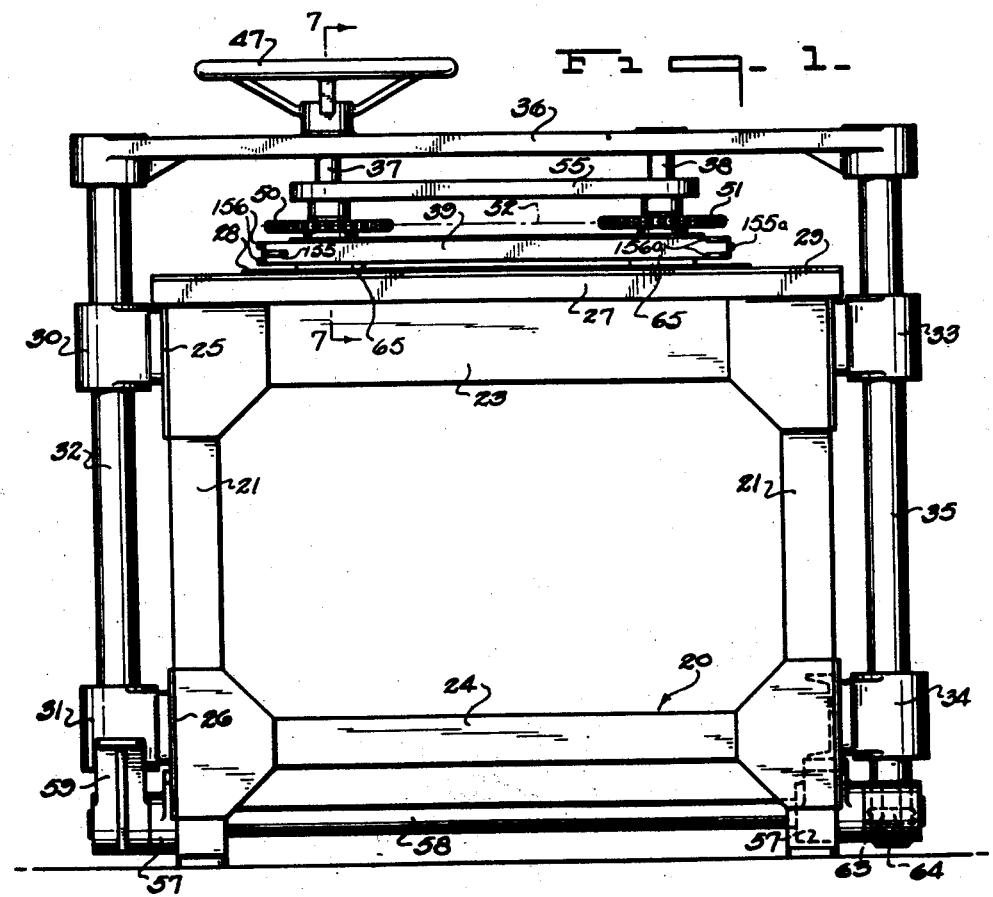
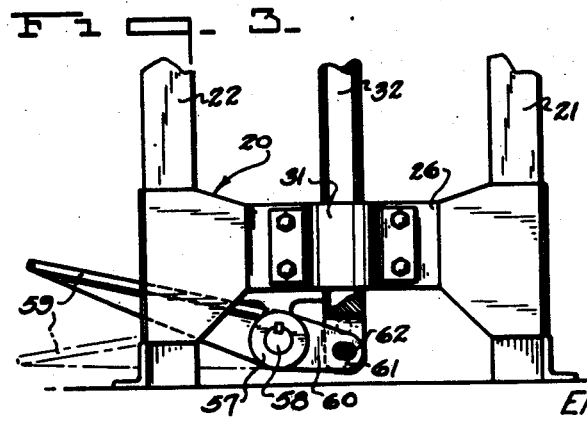
Inventor
EMMETT L. WALTERS.
By
Frank Fraser
Attorney Dec. 31, 1935.   E. L. WALTERS   2,026,109
CUTTING MACHINE
Original Filed Jan. 22, 1934   5 Sheets-Sheet 2
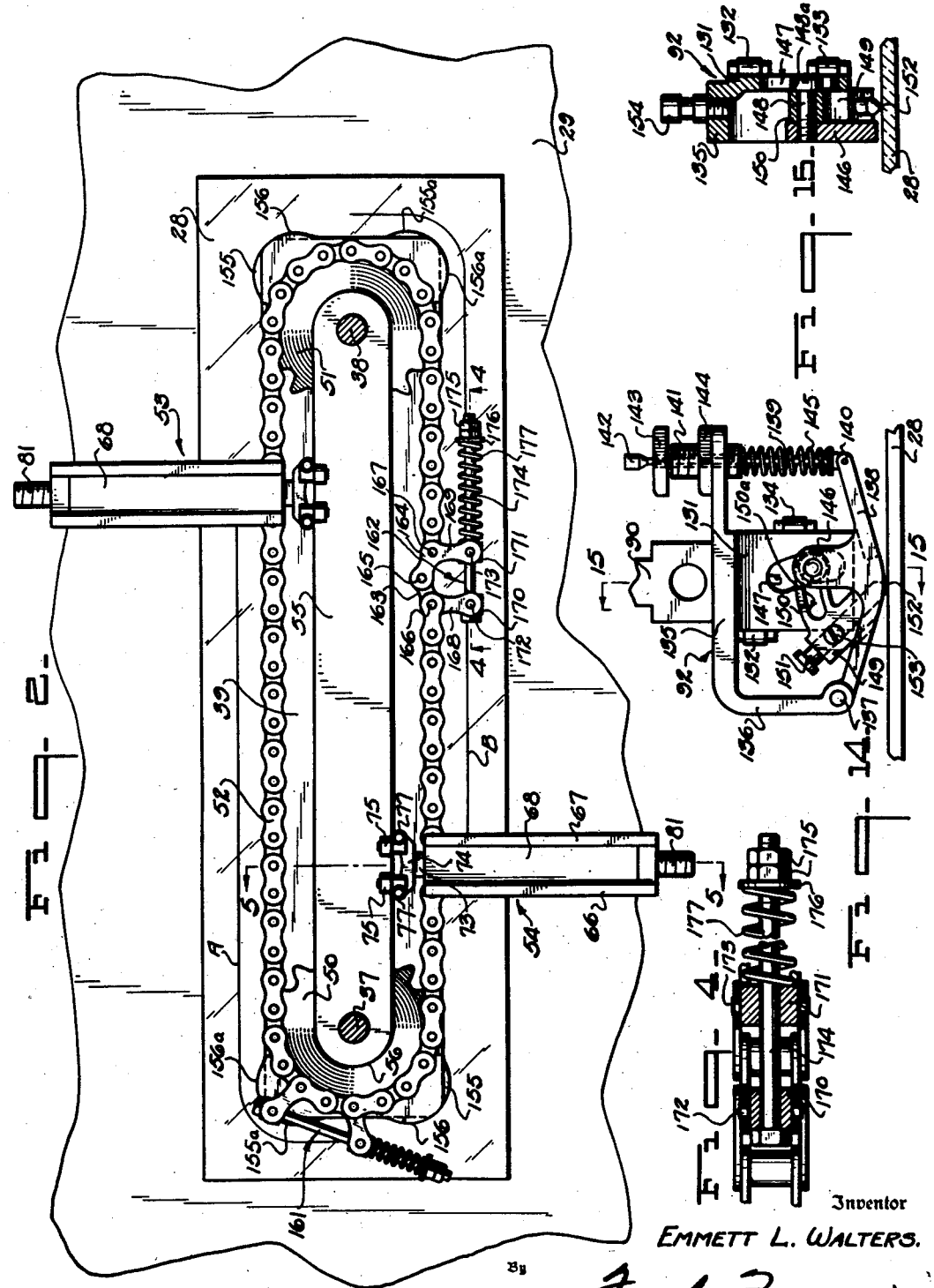
Inventor
EMMETT L. WALTERS.
By
Frank Fraser
Attorney

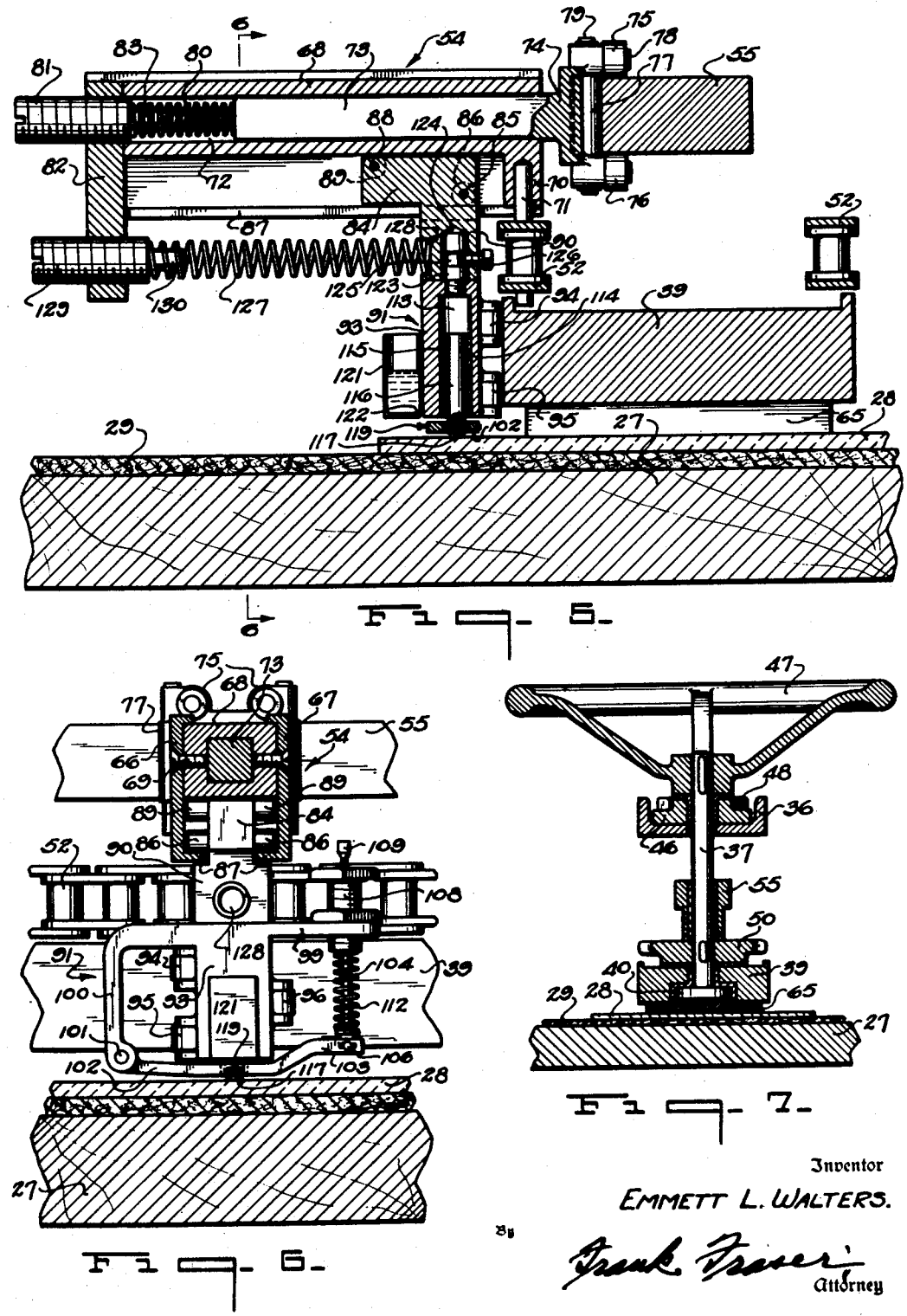

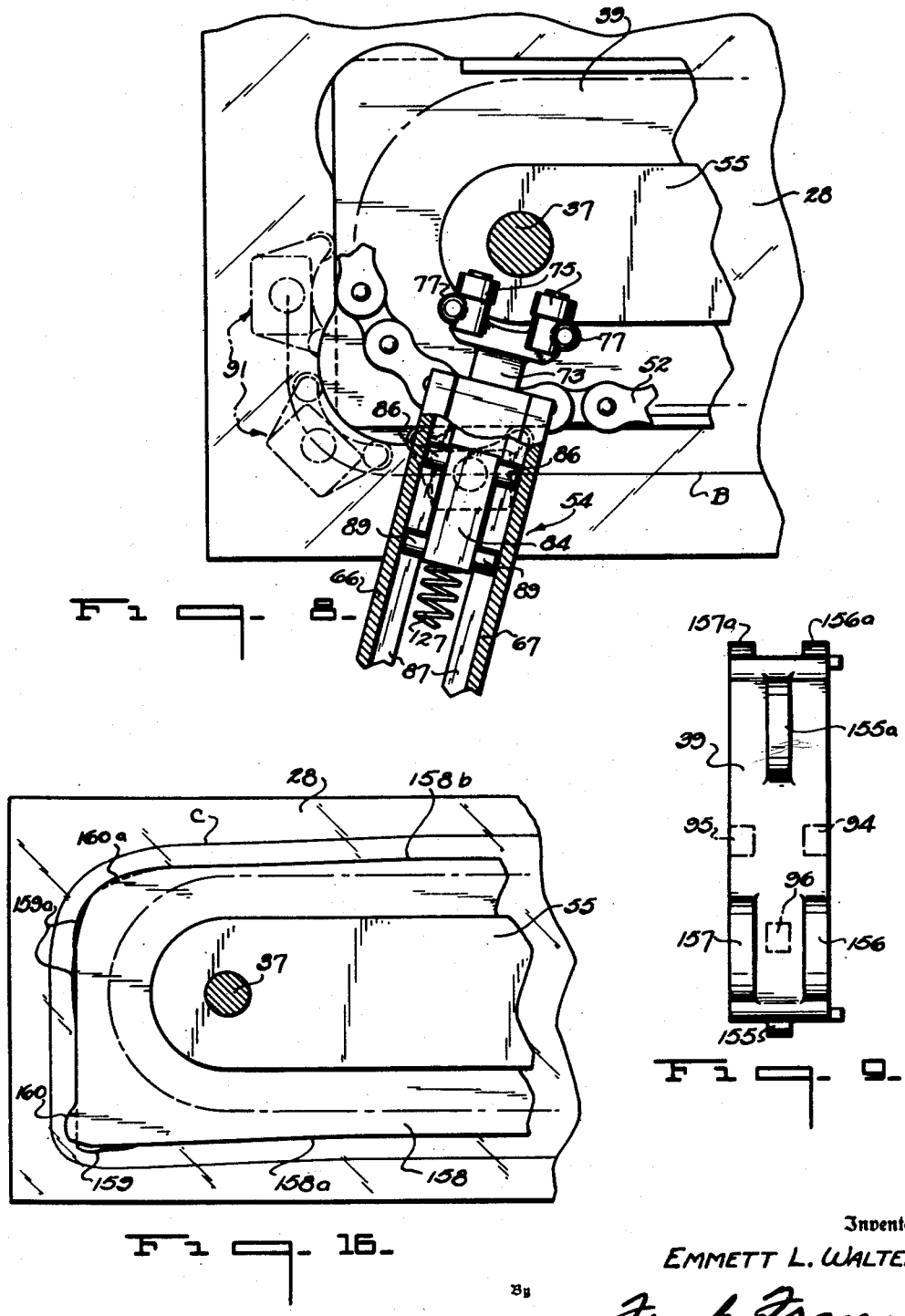

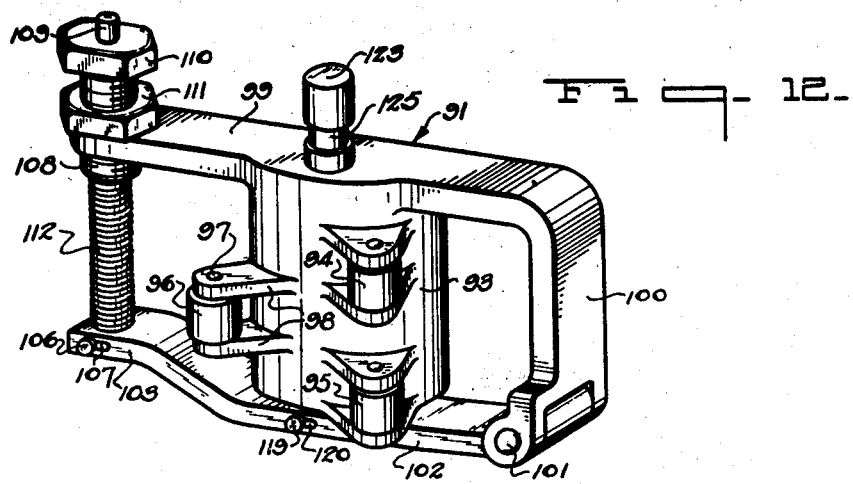
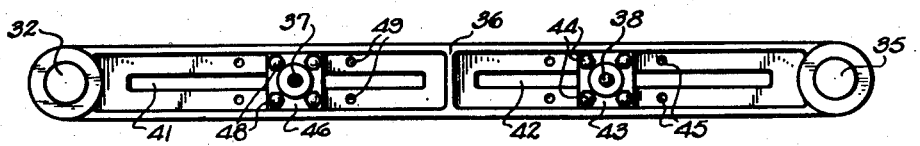
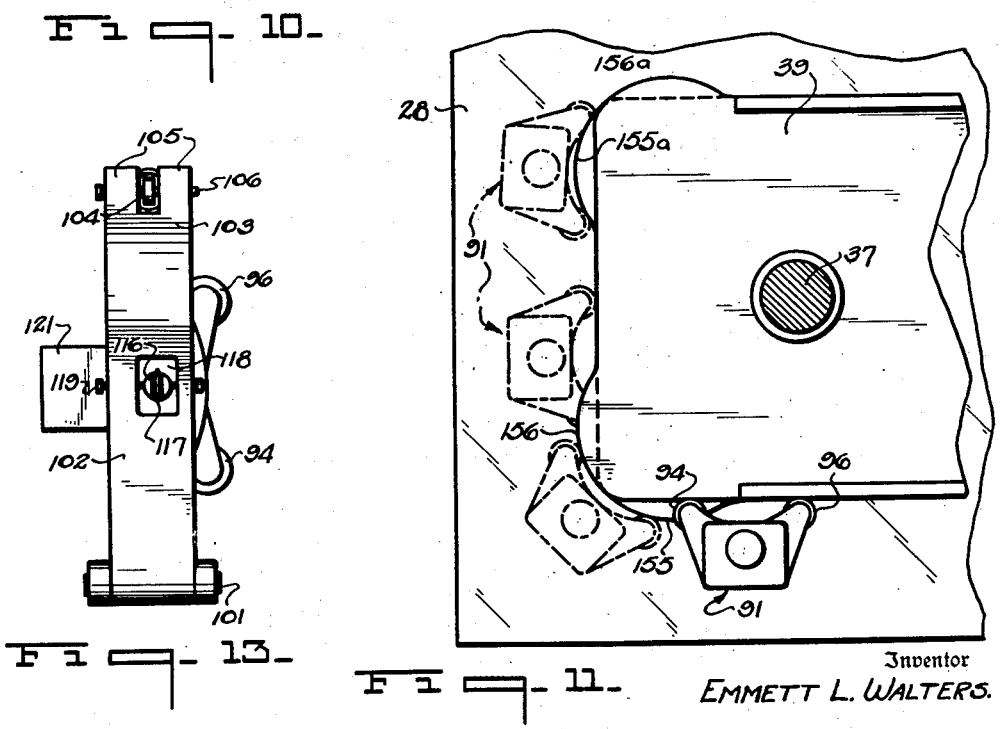
Inventor
EMMETT L. WALTERS.
By Frank Fraser
Attorney Patented Dec. 31, 1935

2,026,109

UNITED STATES PATENT OFFICE 2,026,109

CUTTING MACHINE

Emmett L. Walters, Toledo, Ohio, assignor to Libbey-Owens-Ford Glass Company, Toledo, Ohio, a corporation of Ohio Application January 22, 1934, Serial No. 707,738
Renewed May 3, 1935

21 Claims. (Cl. 33—27)

The present invention relates to certain new and useful improvements in cutting machines and more particularly to those designed primarily for the cutting of glass sheets or plates, although of course not necessarily restricted to such use.

An important object of this invention resides in the provision of a cutting machine for cutting out from glass sheets or plates, forms or lights of various predetermined sizes and/or contours, rapidly, accurately and economically.

At the present time, it is the usual practice, in the cutting out of forms from sheets or plates of glass, to employ a template member or pattern plate of the desired shape and size which is first laid upon the glass sheet to be cut, after which the cutting or scoring tool is drawn over and in contact with the glass, being held in engagement with the outer edges of the template or pattern and guided thereby. After the glass has been scored, the template is removed and the glass broken along the score lines. The cutting or scoring tool commonly employed is of the hand operated variety equipped with either a diamond or a rotatable steel cutting wheel.

The hand method of cutting above described is, however, open to several objections, among which may be mentioned the fact that the template must usually be held upon the glass to be cut with one hand, while the operator draws the cutting tool over the glass with the other hand. When so manipulated, the template sometimes slips or becomes misplaced and the work is spoiled. Also, a uniform cutting pressure on the cutting tool is difficult to maintain throughout its path of travel when moved by hand, with the result that the cut is deeper at some places than at others, so that in separating the waste from the cut section a rough break occurs, leaving the edge of the cut-out section more or less ragged. In the cutting of glass for use in automobile windshields, windows, and the like, an exceptionally accurate cut is desirable, since in the event the sheet is oversize, it requires too much grinding to remove the excess material while, on the other hand, too small a sheet is wasted. When using a hand cutting tool of the type referred to above, if the tool is not held absolutely straight or perpendicular with respect to the glass sheet, the said sheet will be cut either slightly larger or slightly smaller than desired.

It is also an object of this invention to provide a cutting machine which will effectively overcome all of those objectionable features referred to hereinabove as being present in the hand method of cutting, and which can also be successfully operated by relatively unskilled workmen.

Another object of the invention is the provision of a cutting machine of the above character embodying a template member or pattern plate of a predetermined size and shape for guiding the scoring tool or tools during the cutting operation and wherein the change from one template or pattern to another of a different size and/or shape may be easily and quickly effected.

Another object of the invention is to provide such a cutting machine embodying preferably a plurality of cutting tools simultaneously operable in order to facilitate and expedite the cutting operation and thereby reduce the time required for cutting to a minimum.

A further object of the invention is to provide such a cutting machine including novel means for mounting and actuating the cutting tools, together with means for yieldably urging the said tools into engagement with the glass to be cut and likewise means for yieldably maintaining the tool holders in engagement with the template or pattern during the cutting operation.

A still further object of the invention is to provide such a cutting machine in which either a diamond point or a rotatable steel wheel may be utilized as the cutting tool and, further, wherein the different cutting tools are readily interchangeable so that one may be readily and conveniently substituted for the other.

Other objects and advantages of the invention will become more apparent during the course of the following description when taken in connection with the accompanying drawings.

In the drawings, wherein like numerals are employed to designate like parts throughout the same, Fig. 1 is a front elevation of a cutting machine constructed in accordance with the present invention, but with the cutting units removed for the sake of clearness, Fig. 2 is a plan view thereof including the cutting units, Fig. 3 is a detail end view of the lower portion of the supporting frame, partially broken away, Fig. 4 is a detail section taken substantially on line 4—4 of Fig. 2, Fig. 5 is a section taken substantially on line 5—5 of Fig. 2, Fig. 6 is a section taken substantially on line 6—6 of Fig. 5, Fig. 7 is a section taken substantially on line 7—7 of Fig. 1, Fig. 8 is a plan view, partially in section, and showing in broken lines the path of travel of the cutting units in rounding the end of the template, Fig. 9 is an end view of the template, Fig. 10 is a plan view of the template supporting member, Fig. 11 is a diagrammatic plan view somewhat similar to Fig. 8, Fig. 12 is a perspective view of the cutting unit employing a rotatable steel cutting wheel, Fig. 13 is a bottom view of the cutter holder illustrated in Fig. 12, Fig. 14 is an elevation of the cutting unit utilizing a diamond point, Fig. 15 is a section taken substantially on line 15—15 of Fig. 14, and Fig. 16 is a plan view showing the use of a different shaped template for cutting out a different shaped form or light.

Referring now more particularly to the drawings, the cutting machine embodying the present invention includes a substantially rectangular supporting frame, designated in its entirety by the numeral 20 (Figs. 1 and 2) and comprising in its construction a pair of spaced vertical supporting members 21 and 22 arranged at each end thereof, the opposed supporting members at opposite ends of the frame being fastened together adjacent their upper and lower ends by the horizontal connecting members 23 and 24 respectively, while the members 21 and 22 at each end of said frame are tied together adjacent their upper and lower ends by the cross members 25 and 26 respectively. Carried upon the top of the frame 20 is a horizontal supporting plate 27 upon which the glass sheet or plate 28 to be cut is adapted to be laid; a pad 29 of felt or some other suitable material being preferably interposed between the said supporting plate 27 and glass sheet 28 to prevent the said sheet from becoming scratched or otherwise marred.

Secured to the cross members 25 and 26 at one end of the supporting frame 20 are the vertically aligned bearings 30 and 31 within which is slidably mounted the vertical rod 32, while carried by the cross members at the opposite end of said frame are similar vertically aligned bearings 33 and 34 slidably receiving therethrough a vertical rod 35. The rods 32 and 35 project upwardly above the supporting plate or top member 27 and are connected together at their upper ends by the horizontal cross member 36, which is preferably in the form of a channel beam, as best shown in Figs. 7 and 10.

Carried by the cross member 36 are the horizontally spaced vertical rods 37 and 38 respectively, to the lower ends of which is secured the template or pattern member 39, said template being in the form of a substantially flat plate of predetermined size and contour. Each of the vertical rods 37 and 38 is provided at its lower end with an annular head 40 (Fig. 7) which is received within a recess formed in the bottom of the said template.

The channel member 36 is provided with a pair of spaced longitudinally extending aligned slots 41 and 42 (Fig. 10) which receive therethrough the rods 37 and 38 respectively. The rod 38 is received at its upper end within and suitably secured to a slide block 43 slidably mounted within the said channel member 36, said block being adjustably secured in place by fastening elements 44 which pass through openings 45 in said channel member. On the other hand, the rod 37 passes upwardly through a slide block 46 similar to slide block 43 and has keyed to its upper end an operating hand wheel 47, the purpose of which will be more clearly hereinafter apparent. The slide block 46 is also adjustably secured in place by fastening elements 48 received within openings 49 in the said channel member 36. With this construction, it will be readily apparent that the blocks 43 and 46 which support the rods 37 and 38 can be readily moved horizontally toward or away from one another so as to increase or decrease the distance between the rods 37 and 38 whereby to accommodate templates of different sizes and shapes.

Keyed to the vertical rods 37 and 38 above the template 39 are sprockets 50 and 51 respectively about which is trained a sprocket chain 52, said chain being of the usual metal link construction and carrying the two cutting units designated in their entirety by the numerals 53 and 54 (Fig. 2), said cutting units being preferably spaced equal distances apart in the length of the sprocket chain.

Also carried by the rods 37 and 38 above the sprockets 50 and 51 is a substantially rectangular guide bar 55 having rounded ends 56, said bar being preferably relatively narrower and shorter than the template 39 and being provided for guiding the cutting units during the cutting operation. The curved ends 56 of the guide bar are cut on the arc of a circle, the center of which is defined by the axis of rotation of the sprockets 50 and 51.

In accordance with the present invention, the template 39 and associated parts which are carried by the rods 37 and 38 are adapted to be raised and lowered in unison relative to the glass supporting plate 27 so as to lower the cutters into engagement with the glass preparatory to the cutting operation and to lift them therefrom subsequent thereto. To this end, there is carried by the cross member 26, at each end of the supporting frame 20, a depending bearing member 57 and journaled within said members is a horizontal shaft 58 projecting at opposite ends beyond the said frame. Keyed to one end of the shaft 58 is a foot pedal 59 having formed integral therewith an ear 60 connected to the lower end of vertical rod 32 by means of a pin 61 passing transversely through a slot 62 in said ear. The shaft 58 carries at its opposite end a similar ear 63 connected to the lower end of rod 35 by means of a transverse pin 64 in the same manner that ear 60 is connected to rod 32. With this construction, it will be readily apparent that upon the application of a downward pressure upon foot pedal 59, the shaft 58 will be rotated and the rods 32 and 35 moved upwardly by the ears 60 and 63 connected therewith. The upward movement of rods 32 and 35 will also cause the cross member 36 and parts carried thereby to be moved upwardly in unison, thereby raising the cutters out of engagement with the glass. On the other hand, when the pressure upon foot pedal 59 is released, the several parts will be permitted to again move downwardly by gravity. The template 39 preferably does not rest directly upon the glass sheet but is maintained spaced therefrom by a plurality of rubber pads 65, said pads being secured to the bottom surface of the template and being adapted to rest upon the glass sheet to be cut.

Inasmuch as the two cutting units 53 and 54 are of the same construction and arrangement, a detail description of only one will be set forth. Thus, each cutting unit includes a supporting carriage comprising a pair of horizontal spaced parallel channel members 66 and 67 (Fig. 6) facing one another and having arranged between the upper portions thereof an elongated block 68 preferably square in cross section. The channel members 66 and 67 are secured to this block by fastening screws 69. The block 68 is formed at its inner end with a depending portion 70 having a vertical opening for loosely receiving therein a vertical pin 71 (Fig. 5) carried by the sprocket chain 52 so that the cutting unit is carried by and movable with said chain.

The elongated block 68 is also provided with a substantially square opening 72 extending longitudinally therethrough and within which is slidably received a supporting bar 73, said bar projecting forwardly beyond the channel members 66 and 67 and bar 68 and being formed at its outer end with a head 74. The head 74 carries upper and lower pairs of horizontal rollers 75 and 76 which are adapted to engage the upper and lower edges respectively of the guide bar 55, said head 74 also carrying spaced vertical rollers 77 which are adapted to engage the edge of the guide bar. Each horizontal roller 75 and 76 is freely rotatable upon a pin 78 while each vertical roller 77 is carried by a vertical pin 79. The rollers 75, 76 and 77 engaging the guide bar 55 assist in supporting and guiding the cutting unit.

The rollers 77 are maintained in engagement with the guide bar by means of a compression spring 80 arranged within the opening 72 in block 68 inwardly of bar 73. The compression spring 80 bears at one end against the inner end of bar 73 and at its opposite end against the adjacent end of a screw 81 threaded through an end plate 82 carried by block 68, the inner end of said screw being preferably of relatively smaller diameter as at 83 and received within the coils of the spring 80. The spring 80 therefore acts to force the bar 73 outwardly of the block 68 and to maintain the rollers 77 in engagement with the guide bar. The compression of the spring 80 can be varied as desired upon proper adjustment of the screw 81.

Slidably received between the lower portions of the channel members 66 and 67 is a cutter carrier 84, said cutter carrier being preferably relatively narrower than the block 68 as best shown in Fig. 6. Passing transversely through the cutter carrier adjacent the inner end thereof is a pin 85, said pin projecting at its opposite end beyond the carrier and having mounted thereupon rollers 86 which rest upon the bottom horizontal flanges 87 of the channel members 66 and 67. Also passing transversely through the cutter carrier adjacent the outer end thereof is a pin 88 having mounted thereupon rollers 89 which roll along against the under surface of the block 68.

The cutter carrier 86 is provided with a depending portion 90 and carried by this portion is the cutter holder equipped with the cutting or scoring tool. The cutter holder may be either of the type disclosed in Figs. 5, 6, 12 and 3 employing a rotatable steel wheel as the cutting tool or of the type illustrated in Figs. 14 and 15 embodying a cutting diamond. The cutter holder in Figs. 5, 6, 12 and 3 is designated in its entirety by the numeral 91, while the cutter holder of Figs. 14 and 15 is designated in its entirety by the numeral 92. According to the present invention, these two cutter holders are adapted to be readily interchangeable so that either the steel cutting wheel or the diamond point may be used.

The cutter holder 91 comprises a body portion 93 carrying upon one side thereof the three freely rotatable rollers 94, 95 and 96 respectively, said rollers being preferably positioned relative to one another in the manner illustrated in Fig. 12 and each being mounted upon a vertical pin 97 secured at its opposite ends in spaced ears 98 carried by or formed integral with the said body portion. The rollers 94 and 95 are vertically spaced from one another, while the roller 96 is positioned intermediate the rollers 84 and 85 and is horizontally spaced therefrom. These rollers are adapted to engage and ride along the edge of the template 39 as shown in Fig. 5.

The body portion 93 has formed integral with the top thereof a horizontal arm 99 projecting at opposite ends beyond the said body portion and having one end thereof turned downwardly as at 100. Pivoted to the down-turned end portion 100 as at 101 is one end of a horizontal arm 102, the forward end of which is vertically offset as at 103 and is connected with the opposed free end of arm 99 by a vertical pin 104. The free end 103 of arm 102 is bifurcated to provide the spaced ears 105; with the lower end of the pin 104 being secured between said ears by a suitable fastening element 106 passing transversely therethrough and also through slots 107 in ears 105. The vertical pin 104 passes loosely upwardly through an externally threaded sleeve 108 carried by arm 99 and is provided at its upper end with a head 109 which limits the downward movement thereof. The sleeve 108 has formed at its upper end a nut 110 and threaded upon the said sleeve is a lock nut 111. Encircling the pin 104 and bearing at one end against the sleeve 108 and at its opposite end against the offset portion 103 of pivoted arm 102 is a compression spring 112, said spring acting to normally urge the arm 102 downwardly.

The body portion 93 of the cutter holder 91 is provided with a vertical recess 113 open at its lower end and within which is secured a metal bushing 114 having inserted therein a rubber sleeve 115. Slidably received within the sleeve 115 is a stem 116 carrying at its lower end a freely rotatable steel cutting wheel 117. The pivoted arm 102 has a substantially rectangular opening 118 within which the lower end of the stem 116 is received and to which the said stem is secured by means of a pin 119 passing transversely through slots 120 in arm 102 and also through the stem 116, the said cutting wheel 117 being rotatably mounted upon this pin.

From the above, it will be readily understood that since the stem 116 is connected at its lower end to the arm 102, the vertical movement of the cutting wheel 117 will be controlled by movement of the said arm. That is to say, upon pivotal movement of the arm 102, the stem 116 will be caused to slide vertically within the sleeve 115. Also, that the spring 112 which acts to normally urge the arm 102 downwardly will likewise serve to yieldably maintain the cutting wheel in engagement with the work 28. Furthermore, the cutting wheel can be readily removed by simply removing the pin 119.

Also carried by the body portion 93 of cutter holder 91 at the side thereof opposite the rollers 94, 95 and 96 is a receptacle 121 adapted to contain a small opening 122 formed in the bottom thereof. The oil is adapted to pass downwardly through the opening 122 and to creep inwardly along the bottom of the body portion of the cutter holder to the cutting wheel whereby to keep the said wheel properly oiled and thereby facilitate the free rotation thereof upon pin 119. Obviously, the opening 122 will be exceedingly small so that the oil will, in effect, gradually seep therethrough.

As pointed out above, the cutter holder 91 is adapted to be removably connected to the cutter carrier 84 and to this end there is threaded in the top of the body portion 93 of the said cutter holder a stud bolt 123 which is received within a recess 124 in the cutter carrier. The stud bolt 123 is reduced in diameter intermediate its ends to form a circumferential groove 125, and received within this groove is a set screw 126 which serves to secure the cutter holder to the cutter carrier.

In order to yieldably maintain the rollers 94, 95, and 96 in engagement with the edge of the template 39, there is provided a compression spring 127, the inner end of said spring bearing against the cutter carrier 84 and being received within a depression 128 therein, while the opposite end thereof bears against a screw 129 threaded horizontally through the end plate 82, said screw being provided with a reduced end 130 received within the coils of the spring to assist in maintaining the said spring in proper position.

From the above, it will be readily seen that means is herein provided for yieldably maintaining the guide rollers 77 in engagement with the guide bar 55; likewise, that means is provided for yieldably maintaining the rollers 94, 95 and 96 in engagement with the edge of the template 39 and also means for yieldably urging the cutting wheel 117 toward and maintaining it in engagement with the work.

The cutter holder 92, illustrated in Figs. 14 and 15, and which may be used in place of the cutter holder 91 above described, if desired, also comprises a body portion 131, carrying upon one side thereof rollers 132, 133 and 134, which correspond to the rollers 94, 95 and 96 respectively carried by cutter holder 91. Formed integral with the upper end of the body portion 131 is a horizontal arm 135, provided with a downturned end portion 136 to which is pivoted, as at 137, one end of an arm 138, the outer end thereof being connected with the free end of arm 135 by a vertical pin 139. This pin is pivoted at its lower end to arm 138, as at 140, and passes upwardly through an externally threaded sleeve 141 carried by arm 135, said pin having a head 142 at its upper end to limit the downward movement thereof. Carried by the sleeve 141 are nuts 143 and 144, while encircling the pin 139, between arms 135 and 138, is a compression spring 145 which functions to normally urge the said arm 138 downwardly about its pivot 137.

The arm 138 is provided with a vertical ear 146 disposed opposite a substantially arcuate slot 147 formed in the body portion 131. Passing through the slot 147 and threaded within the ear 146 is a screw 148. The numeral 149 designates a supporting member which is provided with a laterally offset arm 150 having an arcuate slot 150a therein adapted to loosely receive the screw 148 therethrough. Carried by the supporting member 149 is the cutter holder 151, having at its lower end a diamond point 152, said holder being secured in adjusted position within the supporting member by a set screw 153.

From the above, it will be seen that the supporting member 149 is carried by the screw 148 and that, due to the provision of the arcuate slot 150a, the cutter holder 151 can be swung through a substantially vertical arc to vary and adjust the position of the cutting diamond 152 with respect to the sheet to be cut. Also, by reason of the slot 147 in body portion 131, the arm 138 is permitted to move either upwardly or downwardly about its pivot, with the spring 145 serving to urge the cutting diamond toward and yieldably maintain it in engagement with the sheet 28 to be cut. The supporting member 149 and consequently the cutting tool 152 can be firmly secured in desired adjusted position by simply tightening the screw 148 to clamp the arm 150 between the ear 146 and the head 148a of the said screw 148.

The cutter holder 92 is also provided with a vertical stud bolt 154 by means of which the said holder can be removably attached to the cutter carrier 84, in lieu of the cutter holder 91, when it is preferred to use a diamond as the cutting element instead of a rotatable steel wheel.

Although the template 39 may be of any desired shape and size, depending entirely upon the shape and size of form or light to be cut, the template illustrated in Figs. 1, 2, 8, 9 and 11 comprises a substantially flat, rectangular plate having formed at each corner thereof a plurality of cam faces over and in contact with which the rollers carried by cutter holder 91 or 92 are adapted to ride.

The cam faces at each of two diagonal corners of the template 39 are designated 155, 156 and 157, while the cam faces at the two other diagonal corners are designated 155a, 156a and 157a. The cams 156 and 157 are formed on the ends of the template and are vertically spaced from but in alignment with one another, while the cams 155 are arranged at right angles to the cams 156 and 157; being formed upon the sides of said template at a point intermediate the top and bottom edges thereof (Fig. 9). The cams 155a, 156a and 157a are formed upon the template and arranged relative to one another in the same manner as cams 155, 156 and 157 respectively so that the arrangement of the cams at each of the four corners of the template is identical.

The cams 155, 156 and 157 are so positioned with respect to one another that at the instant the rollers 94 and 95 on cutter holder 91 or the rollers 132 and 133 on cutter holder 92 engage cams 156 and 157, the roller 96 on cutter holder 91 or roller 134 on cutter holder 92 will engage cam 155, as a result of which the cutter holder and consequently the cutting wheel or diamond point carried thereby will be swung through an arc around the corner of the template. Likewise, when the rollers 94 and 95 on cutter holder 91 or rollers 132 and 133 on cutter holder 92 pass out of engagement with cams 156 and 157, the roller 96 on cutter holder 91 or roller 134 on cutter holder 92 will pass out of engagement with cam 155. Since the cams 155a, 156a and 157a are arranged similarly to cams 155, 156 and 157 respectively, the cutter holder will engage and ride over these cams in the same manner. With this type of template, the form or light cut from the glass sheet 28 will be substantially rectangular, having straight parallel side and end edges with rounded corners cut on an arc.

In the operation of the present invention and when it is desired to cut out a form or light from a sheet of glass, the operator first depresses the foot pedal 59 to effect the raising of the horizontal cross member 36 and consequently the lifting of the template 39 and cutting units 53 and 54 away from the supporting plate or table 27.

The sheet of glass 28 to be cut is then laid upon the table, after which the operator releases pedal 59 to permit the lowering of the template and cutting units by gravity. When so lowered, the resilient pads 65, carried upon the bottom of the template, will rest upon the upper surface of the glass sheet and serve to hold said sheet against slippage during the scoring thereof. It will of course be understood that when the cutting units 53 and 54 are lowered, the cutting elements carried thereby will be brought into engagement with the upper surface of the glass sheet and will be yieldably maintained in contact therewith. The operator then turns the hand wheel 47 in the proper direction to effect rotation of the sprockets 50 and 51 and movement of the sprocket chain 52. This movement of the sprocket chain will cause a corresponding movement of the cutting units 53 and 54 to carry the cutting elements over and in contact with the glass sheet to score the same.

The cutting elements carried by the cutting units 53 and 54 will act to simultaneously score the glass sheet, the cutting unit 53 forming score line A, while the cutting unit 54 is scoring the glass along the line B. The movement of the cutting units is continued until the score lines A and B meet to form a continuous unbroken score line, after which the operator again depresses foot pedal 59 to raise the cutting units away from the glass to permit of the removal of the sheet. The glass can then be broken along the score line in the manner well known in the art. This operation can then be repeated to cut out as many lights or forms of the same shape and size as desired. Manifestly, the shape and size of the template will determine the shape of the form or light cut from the glass sheet and, as brought out hereinabove, provision is made for mounting the template in a manner that it may be readily removed to permit of the use of templates of different shapes and sizes.

Although there has been illustrated and described herein the use of two cutting units 53 and 54, it will be readily apparent that only one unit may be employed if desired. However, the use of two units will greatly facilitate and expedite the scoring of the glass. As the cutting units are being carried along by the sprocket chain, the rollers carried by the cutter holder will ride along the edges of the template as well as over the cam faces, as above described, to cause the cutting elements to be moved through the desired path. The spring 127 serves to yieldably maintain the cutter holder in engagement with the template at all times.

In order to maintain the sprocket chain 52 tight and thereby prevent any slack therein, the said chain has associated therewith a pair of chain tighteners 161 and 162 respectively illustrated in Figs. 2, 5 and 6. Since these two chain tighteners are of identical construction, a description of only one will be given. Thus, the pairs of links 163 and 164 are pivoted together as at 165 and are also pivoted in the length of the sprocket chain at 166 and 167 respectively. The links 163 and 164 are provided with angular extensions 168 and 169 between the outer ends of which are arranged blocks 170 and 171 respectively carried by trunnions 172 and 173 which pass through the said angular extensions 168 and 169. Passing loosely through the blocks 170 and 171 is a horizontal bolt 174 having threaded upon its outer end nuts 175. Encircling the bolt 174 and bearing at one end against the block 171 and at its opposite end against a washer 176 is a compression spring 177 which acts to normally urge the blocks 170 and 171 toward one another to cause a slight inward buckling of the links 163 and 164 about pivot point 165 as shown upon the chain tightener 162 in Fig. 2.

Upon reference to Fig. 2, it will be seen that the chain tightener 161 is shown in engagement with sprocket 50 while the chain tightener 162 is out of engagement with either sprocket, and, in fact, the two chain tighteners are so positioned in the length of the sprocket chain that they will not engage the sprockets at the same time. When the chain tightener is in engagement with one of the sprockets, the angular extensions 168 and 169 of links 163 and 164 will be forced outwardly away from one another to place the spring 177 under compression. On the other hand, the chain tightener 162 shows the position assumed by the links 163 and 164 during the time the said links are out of engagement with the sprockets, at which time the spring 177 forces the extensions 168 and 169 together. By having two chain tighteners arranged in this manner, it will be readily apparent that the chain will always be kept taut and that when either tightener is in engagement with one of the sprockets, the other tightener will act to take up any slack in the chain.

In Fig. 16 is illustrated a somewhat differently shaped template for cutting out a form or light of a different contour from the sheet or plate of glass 28. The template here shown is designated 158 and also comprises a flat substantially rectangular plate having one substantially straight longitudinal edge 158a and an outwardly curved longitudinal edge 158b. Formed upon the edge of the template at each end thereof is a single cam face 159 corresponding to the cam 155 on template 39 and a pair of spaced cam faces 160 which correspond to the cams 156 and 157 on the said template 39. Also formed upon the edge of the template 158 at the opposed corner thereof is a single cam face 159a corresponding to cam 155a on template 39 and a pair of spaced cam faces 160a corresponding to cams 156a and 157a on the said template 39. The rollers carried by the cutter holders are adapted to ride along the edge of the template 158 and over the cam faces formed thereon in the same manner as described hereinabove in connection with the travel of the cutter holders in engagement with template 39. At C in Fig. 16 is shown the path of travel of the cutting elements and which line designates the shape or outline of the form or light cut from the glass sheet. As pointed out above, the contour of the light or form cut from the glass sheet is dependent entirely upon the template used and that, by changing the shape and/or size of the template as well as the cam faces formed at the opposite ends thereof, the contour of the form or light cut from the sheet can be changed as desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a sheet glass cutting machine of the character described, a horizontal support for the sheet to be cut, a horizontally disposed template arranged above said sheet, an endless flexible element, horizontally spaced driving members positioned above said template and about which said flexible element is trained, a cutting unit carried by said flexible element and including a cutter holder adapted to engage the edge of said template, a cutting element carried by said holder and engaging the sheet to be cut, and means for positively rotating one of said driving members to effect the desired movement of the flexible element and cutting unit.

2. In a sheet glass cutting machine of the character described, a horizontal support for the sheet to be cut, a horizontally disposed template arranged above said sheet, an endless flexible element, horizontally spaced driving members positioned above said template and about which said flexible element is trained, a cutting unit carried by said flexible element and including a cutter holder adapted to engage the edge of said template, a cutting element carried by said holder and engaging the sheet to be cut, means for positively rotating one of said driving members to effect the desired movement of the flexible element and cutting unit, means for yieldably urging the cutting element into engagement with the glass, and means for yieldably maintaining the cutter holder in engagement with said template.

3. In a sheet glass cutting machine of the character described, a horizontal support for the sheet to be cut, a horizontally disposed template arranged above said sheet, an endless sprocket chain, horizontally spaced sprockets positioned above said template and about which said sprocket chain is trained, a cutting unit carried by said sprocket chain and including a cutter holder adapted to engage the edge of said template, a cutting element carried by said holder and engaging the sheet to be cut, and means for positively rotating one of said sprockets to effect the desired movement of the sprocket chain and cutting unit.

4. In a sheet glass cutting machine of the character described, a horizontal support for the sheet to be cut, a horizontally disposed template arranged above said sheet, an endless sprocket chain, horizontally spaced sprockets positioned above said template and about which said sprocket chain is trained, a cutting unit carried by said sprocket chain and including a cutter holder adapted to engage the edge of said template, a cutting element carried by said holder and engaging the sheet to be cut, means for positively rotating one of said sprockets to effect the desired movement of the sprocket chain and cutting unit, means for yieldably urging the cutting element into engagement with the glass, and means for yieldably maintaining the cutter holder in engagement with said template.

5. In a sheet glass cutting machine of the character described, a horizontal support for the sheet to be cut, a horizontally disposed template arranged above said sheet, an endless flexible element, horizontally spaced driving members positioned above said template and about which said flexible element is trained, a cutting unit carried by said flexible element and including a cutter holder adapted to engage the edge of said template, a cutting element carried by said holder and engaging the sheet to be cut, a horizontal guide bar spaced above the template, rollers carried by the cutting unit and engaging said guide bar, and means for positively rotating one of said driving members to effect the desired movement of the flexible element and cutting unit.

6. In a sheet glass cutting machine of the character described, a horizontal support for the sheet to be cut, a horizontally disposed template arranged above said sheet, an endless flexible element, horizontally spaced driving members positioned above said template and about which said flexible element is trained, a cutting unit carried by said flexible element and including a cutter holder adapted to engage the edge of said template, a cutting element carried by said holder and engaging the sheet to be cut, a horizontal guide bar spaced above the template, rollers carried by the cutting unit and engaging said guide bar, means for positively rotating one of said driving members to effect the desired movement of the flexible element and cutting unit, means for yieldably urging the cutter holder into engagement with the template, and spring means for maintaining the rollers carried by the cutting unit in engagement with said guide bar.

7. In a sheet glass cutting machine of the character described, a horizontal support for the sheet to be cut, a horizontally disposed template arranged above said sheet, an endless flexible element, horizontally spaced driving members positioned above said template and about which said flexible element is trained, a cutting unit carried by said flexible element and including a cutter holder adapted to engage the edge of said template, a cutting element carried by said holder and engaging the sheet to be cut, means for positively rotating one of said driving members to effect the desired movement of the flexible element and cutting unit, and means for raising and lowering the template and cutting unit in unison.

8. In a sheet glass cutting machine of the character described, a horizontal support for the sheet to be cut, a horizontally disposed template arranged above said sheet, an endless flexible element, horizontally spaced driving members positioned above said template and about which said flexible element is trained, a cutting unit carried by said flexible element and including a cutter holder adapted to engage the edge of said template, a cutting element carried by said holder and engaging the sheet to be cut, a horizontal guide bar spaced above the template, rollers carried by the cutting unit and engaging said guide bar, means for positively rotating one of said driving members to effect the desired movement of the flexible element and cutting unit, and means for raising and lowering the template, cutting unit and guide bar in unison.

9. In a sheet glass cutting machine of the character described, a horizontal support for the sheet to be cut, a horizontally disposed template arranged above said sheet and being in the form of a substantially flat plate, an endless flexible element, horizontally spaced driving members positioned above said template and about which said flexible element is trained, a cutting unit carried by said flexible element and including a cutter holder, a plurality of rollers carried by said cutter holder and adapted to engage the edge of said template, a cutting element also carried by the cutter holder and engaging the sheet to be cut, and means for positively rotating one of said driving members to effect the desired movement of the flexible element and cutting unit.

10. In a sheet glass cutting machine of the character described, a horizontal support for the sheet to be cut, a horizontally disposed template arranged above said sheet and being in the form of a substantially flat plate, an endless flexible element, horizontally spaced driving members positioned above said template and about which said flexible element is trained, a cutting unit carried by said flexible element and including a cutter holder, a plurality of rollers carried by said cutter holder and adapted to engage the edge of said template, a cutting element also carried by the cutter holder and engaging the sheet to be cut, means for yieldably maintaining said rollers in engagement with said template, a horizontal guide bar spaced above the template, rollers carried by the cutting unit and engaging said guide bar, spring means for maintaining the last-mentioned rollers in engagement with the said guide bar, and means for positively rotating one of said driving members to effect the desired movement of the flexible element and cutting unit.

11. In a sheet glass cutting machine of the character described, a horizontal support for the sheet to be cut, a horizontally disposed template arranged above said sheet and being in the form of a substantially flat plate having a plurality of cam faces formed on the edge thereof, an endless flexible element, horizontally spaced driving members positioned above said template and about which said flexible element is trained, a cutting unit carried by the flexible element and including a cutter holder, a plurality of rollers carried by said holder and adapted to engage the edge of said template, a cutting element also carried by the cutter holder and engaging the sheet to be cut, and means for positively rotating one of said driving members to effect the desired movement of the flexible element and cutting unit.

12. In a sheet glass cutting machine of the character described, a horizontal support for the sheet to be cut, a horizontally disposed template arranged above said sheet and being in the form of a substantially flat plate having a pair of vertically spaced cam faces formed on one edge thereof and a third cam face positioned intermediate the two first mentioned cam faces and horizontally spaced therefrom, an endless flexible element, horizontally spaced driving members positioned above said template and about which said flexible element is trained, a cutting unit carried by said flexible element and including a cutter holder, three rollers carried by said cutter holder and adapted to engage the edge of said template, two of said rollers being adapted, upon movement of said cutting unit, to engage the vertically spaced cam faces while the third roll is adapted to engage said intermediate cam face, a cutting element carried by said cutter holder and engaging the sheet to be cut, and means for positively rotating one of said driving members to effect the desired movement of the flexible element and cutting unit.

13. In a sheet glass cutting machine of the character described, a horizontal support for the sheet to be cut, a horizontally disposed template arranged above said sheet and being in the form of a substantially flat plate having a plurality of cam faces formed on the edge thereof, an endless flexible element, horizontally spaced driving members positioned above said template and about which said flexible element is trained, a cutting unit carried by the flexible element and including a cutter holder, a plurality of rollers carried by said cutter holder and adapted to engage the edge of said template, a cutting element also carried by the cutter holder and engaging the sheet to be cut, means for positively rotating one of said driving members to effect the desired movement of the flexible element and cutting unit, and means for maintaining the flexible element tight.

14. In a sheet glass cutting machine of the character described, a horizontal support for the sheet to be cut, a horizontally disposed template arranged above said sheet and being in the form of a substantially flat plate having a plurality of cam faces formed on the edge thereof, an endless sprocket chain, horizontally spaced sprockets positioned above said template and about which the sprocket chain is trained, a plurality of cutting units carried by the sprocket chain and each including a cutter holder adapted to engage the edge of said template, a cutting element carried by each cutter holder and engaging the sheet to be cut, means for positively rotating one of said sprockets to effect the desired movement of the sprocket chain and cutting units, and a pair of chain tighteners carried by said sprocket chain.

15. In a sheet glass cutting machine of the character described, a horizontal support for the sheet to be cut, a horizontally disposed template arranged above said sheet and being in the form of a substantially flat plate, a pair of vertical rods for carrying the template, means for mounting said rods so that they are movable horizontally relative to one another to accommodate templates of different sizes, a sprocket carried by each rod, a sprocket chain trained about said sprockets, a cutting unit carried by said chain and including a cutter holder adapted to engage the edge of said template, a cutting tool carried by said holder and engaging the glass to be cut, and means for positively rotating one of said rods and the sprocket carried thereby to drive the said sprocket chain.

16. In a sheet glass cutting machine of the character described, a horizontal support for the sheet to be cut, a horizontally disposed template arranged above said sheet and being in the form of a substantially flat plate having a plurality of cam faces formed on the edge thereof, an endless sprocket chain, horizontally spaced sprockets positioned above said template and about which said sprocket chain is trained, a cutting unit carried by said sprocket chain and including a cutter holder, a plurality of rollers carried by said cutter holder and adapted to engage the edge of said template, a cutting element also carried by the cutter holder and engaging the sheet to be cut, means for yieldably maintaining said rollers in engagement with said template, a horizontal guide bar spaced above the template, rollers carried by the cutting unit and engaging the guide bar, spring means for maintaining the last-mentioned rollers in engagement with said guide bar, and means for positively rotating one of said sprockets to effect the desired movement of the sprocket chain and cutting unit.

17. In combination with a template in the form of a substantially flat plate, a cutting unit including a supporting means, a cutter carrier slidably mounted upon said supporting means, a cutter holder carried by said carrier and including a plurality of rollers adapted to engage the edge of said template, means for urging the cutter holder in a predetermined direction to yieldably maintain the rollers carried thereby in engagement with the template, a pivoted arm carried by the cutter holder, a cutting element carried by said arm, and spring means for urging the said arm downwardly to yieldably maintain the cutting element in engagement with the work.

18. In cutting mechanism of the character described, a cutting unit including a supporting means, a cutter carrier slidably mounted upon said supporting means, a cutter holder removably carried by said carrier and including a body portion, a horizontal stationary arm formed integral with said body portion and having a down-turned end, a movable arm pivotally attached at one end to the down-turned end of said stationary arm, a rotatable cutting wheel carried by said pivoted arm, and spring means interposed between the outer end of the pivoted arm and the stationary arm for urging the cutting wheel toward and maintaining it in engagement with the work.

19. In cutting mechanism of the character described, a cutting unit including a supporting means, a cutter carrier slidably mounted upon said supporting means, a cutter holder removably carried by said carrier and including a body portion, a horizontal stationary arm formed integral with said body portion and having a down-turned end, a movable arm pivotally attached at one end to the down-turned end of said stationary arm, said body portion being formed with an arcuate slot, a horizontal pin carried by the pivoted arm and loosely received within said slot, a supporting member carried by said pin and having an offset portion provided with an arcuate slot for loosely receiving the said pin therethrough, a cutting diamond carried by said supporting member, and spring means interposed between the outer end of said pivoted arm and the stationary arm for urging the cutting diamond toward and maintaining it in engagement with the work.

20. In combination with a template in the form of a substantially flat plate, a cutting unit including a supporting means, a cutter carrier slidably mounted upon said supporting means, a cutter holder carried by said carrier and including a plurality of rollers adapted to engage the edge of said template, means for urging said cutter carrier in a predetermined direction to yieldably maintain said rollers in engagement with the template, a cutting element carried by the cutter holder, and means for urging the cutting element downwardly to yieldably maintain the same in engagement with the work.

21. In combination with a template in the form of a substantially flat plate, a cutting unit including a supporting means provided with a horizontal runway, a cutter carrier slidably mounted upon said supporting means and having rollers engaging said runway, a cutter holder carried by said carrier and including a pair of rollers adapted to engage the edge of said template, means for urging said cutter carrier in a predetermined direction to yieldably maintain said rollers in engagement with the template, a cutting element carried by said holder, and spring means for urging said cutting element downwardly to yieldably maintain the same in engagement with the work.

EMMETT L. WALTERS.